(12) United States Patent
Branover et al.

(10) Patent No.: US 12,086,009 B2
(45) Date of Patent: Sep. 10, 2024

(54) USING A HARDWARE-BASED CONTROLLER FOR POWER STATE MANAGEMENT

(71) Applicant: Advanced Micro Devices, Inc., Santa Clara, CA (US)

(72) Inventors: Alexander J. Branover, Boxborough, MA (US); Thomas J. Gibney, Boxborough, MA (US); Mihir Shaileshbhai Doctor, Santa Clara, CA (US); Indrani Paul, Austin, TX (US); Benjamin Tsien, Santa Clara, CA (US); Stephen V. Kosonocky, Fort Collins, CO (US); John P. Petry, San Diego, CA (US); Christopher T. Weaver, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/710,521

(22) Filed: Mar. 31, 2022

(65) Prior Publication Data

US 2023/0315188 A1    Oct. 5, 2023

(51) Int. Cl.
*G06F 1/32* (2019.01)
*G06F 1/3234* (2019.01)

(52) U.S. Cl.
CPC ................... *G06F 1/3234* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 2010/0077243 A1* | 3/2010 | Wang | ............... | G06F 1/3209 |
| | | | | 713/323 |
| 2010/0162256 A1* | 6/2010 | Branover | ............ | G06F 1/3203 |
| | | | | 718/104 |
| 2011/0291748 A1* | 12/2011 | Li | ............. | G06F 1/3287 |
| | | | | 327/544 |
| 2014/0258749 A1* | 9/2014 | Wamg | ............... | G06F 1/3234 |
| | | | | 713/320 |
| 2015/0370311 A1* | 12/2015 | Eckert | ............. | G06F 1/3293 |
| | | | | 713/323 |
| 2016/0321183 A1* | 11/2016 | Govindan | ............ | G06F 1/3296 |

* cited by examiner

*Primary Examiner* — Paul B Yanchus, III
(74) *Attorney, Agent, or Firm* — Volpe Koenig

(57) ABSTRACT

Methods and systems are disclosed for transitioning, by a hardware-based controller, a system on a chip (SoC) into different power states. Techniques disclosed include tracking, by the controller, metrics associated with the SoC and transitioning, by the controller, the SoC from a first power state to a second power state based on the tracked metrics. Were the total amount of power that is used by at least a portion of the transition between the first power state to the second power state and a time spent in the second power state is less than the total amount of power that would have been used by remaining in the first power state.

20 Claims, 4 Drawing Sheets

100

200

300

400

USING A HARDWARE-BASED CONTROLLER FOR POWER STATE MANAGEMENT

BACKGROUND

To reduce power consumption, computing systems, such as a system on a chip (SoC), transition into lower power states during time periods in which the systems are idle. Typically, the operating system of an SoC employs software-controlled techniques to determine when and what power state to transition the SoC into. Such a determination is based on information measured from hardware components, the collection of which, by software, increases the system's latency and limits the frequency at which such measurements can be obtained. As a result, power state transitions, employed by software-controlled techniques, are often utilized only during long periods in which the system is idle, while short periods of system idleness cannot be capitalized upon for power consumption saving.

BRIEF DESCRIPTION OF THE DRAWINGS

A more detailed understanding may be had from the following description, given by way of example in conjunction with the accompanying drawings wherein.

DETAILED DESCRIPTION

Figure 1:
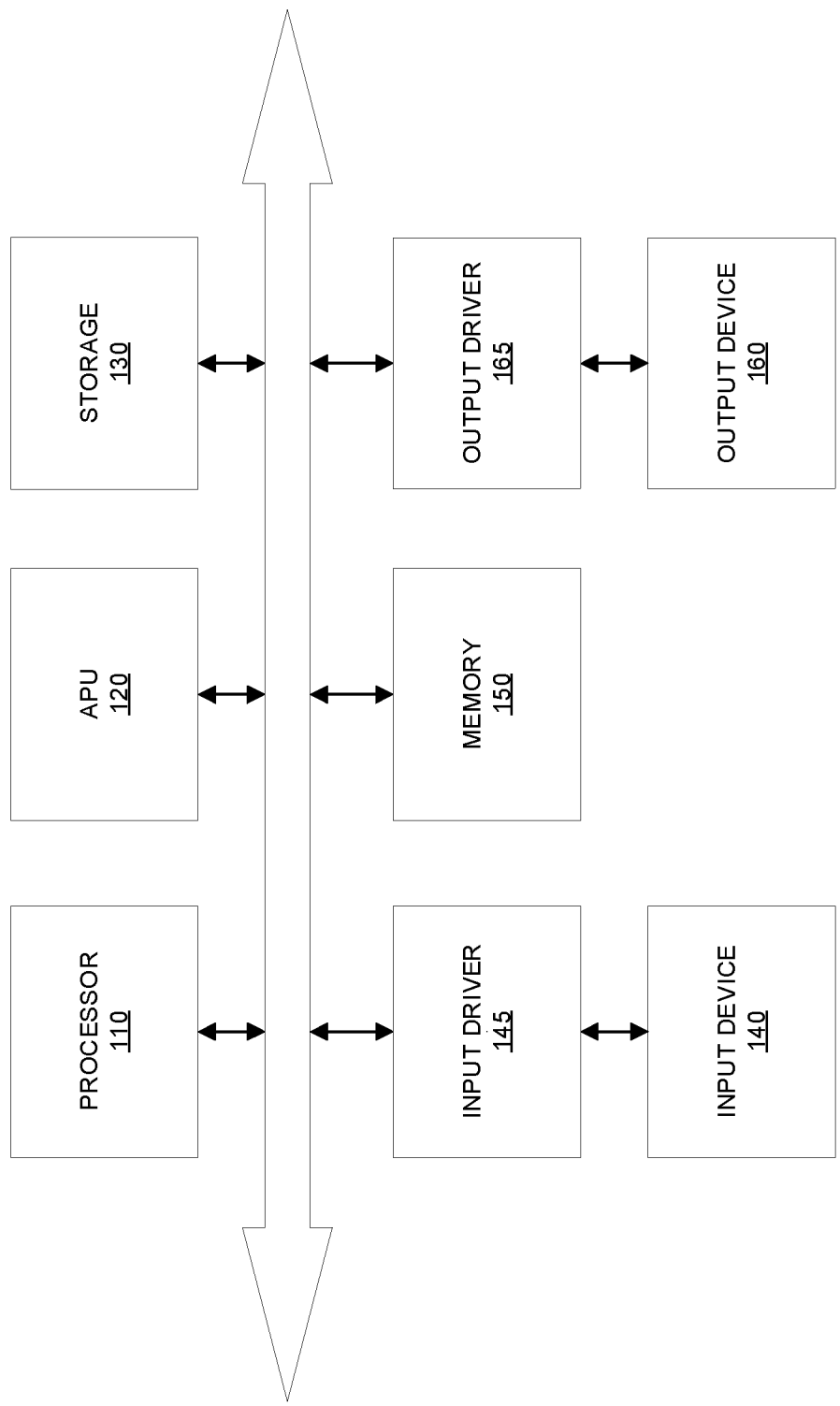
FIG. 1 is a block diagram of an example device, based on which one or more features of the disclosure can be implemented.

Systems and methods are provided for managing power states in an SoC by a hardware-based controller (also referred to herein as a Z-state controller). The hardware-based controller disclosed herein enables fine-grained power state control relative to the coarse-grained power state control afforded by a software-based controller. The use of a hardware-based controller to transition an SoC into different power states allows for further energy saving. By powering down components of the SoC, during short (as well as long) periods of idleness, the total amount of power consumption is reduced. The hardware-based controller, as disclosed herein, tracks system metrics, indicative of the worthiness, in terms of the resulting saving in power, of entering into low power states. The metrics include measurements associated with current and past states of components associated with the SoC. Tracking these metrics, by the hardware-based controller, allows for decision making based on these metrics in fine granularity (e.g., in an order of a few microseconds) and in a manner that is transparent to the software layer of the SoC.

Aspects disclosed in the present disclosure describe methods for transitioning, by a hardware-based controller, an SoC into different power states. Methods disclosed comprise tracking, by the controller, metrics associated with the SoC and transitioning, by the controller, the SoC from a first power state to a second power state based on the tracked metrics. Where the total amount of power that is used by at least a portion of the transition between the first power state to the second power state and a time spent in the second power state is less than the total amount of power that would have been used by remaining in the first power state.

Aspects disclosed in the present disclosure also describe a controller for transitioning an SoC into different power states. The controller comprises at least one processor and memory storing instructions. The instructions, when executed by the at least one processor, cause the controller to track metrics associated with the SoC and to transition the SoC from a first power state to a second power state based on the tracked metrics. Where the total amount of power that is used by at least a portion of the transition between the first power state to the second power state and a time spent in the second power state is less than the total amount of power that would have been used by remaining in the first power state.

Further, aspects disclosed in the present disclosure describe a non-transitory computer-readable medium comprising instructions executable by at least one processor to perform methods for transitioning, by a hardware-based controller, an SoC into different power states. The methods comprise tracking, by the controller, metrics associated with the SoC and transitioning, by the controller, the SoC from a first power state to a second power state based on the tracked metrics. Where the total amount of power that is used by at least a portion of the transition between the first power state to the second power state and a time spent in the second power state is less than the total amount of power that would have been used by remaining in the first power state.

FIG. 1 is a block diagram of an example device 100, based on which one or more features of the disclosure can be implemented. The device 100 can be, for example, a computer, a gaming device, a handheld device, a set-top box, a television, a mobile phone, or a tablet computer. The device 100 can include a processor 110, an accelerated processing unit (APU) 120, storage 130, an input device 140, memory 150, and an output device 160. The device 100 can also include an input driver 145 and an output driver 165. The processor 110 and the APU 120 can represent one or more cores of central processing units (CPUs) and one or more cores of APUs, respectively. The memory 150 can represent volatile or non-volatile memory, including random-access memory (RAM), SRAM, dynamic random-access (DRAM), a cache, or a combination thereof. The processor 110, the APU 120, and the memory 150, or a subset thereof, may be located on the same die or on separate dies. In an aspect, the device 100 can include additional components not shown in FIG. 1.

The APU 120 can represent a graphics processing unit (GPU), that is, a shader system comprising one or more parallel processing units that are configured to perform computations, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160).

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

Figure 2:
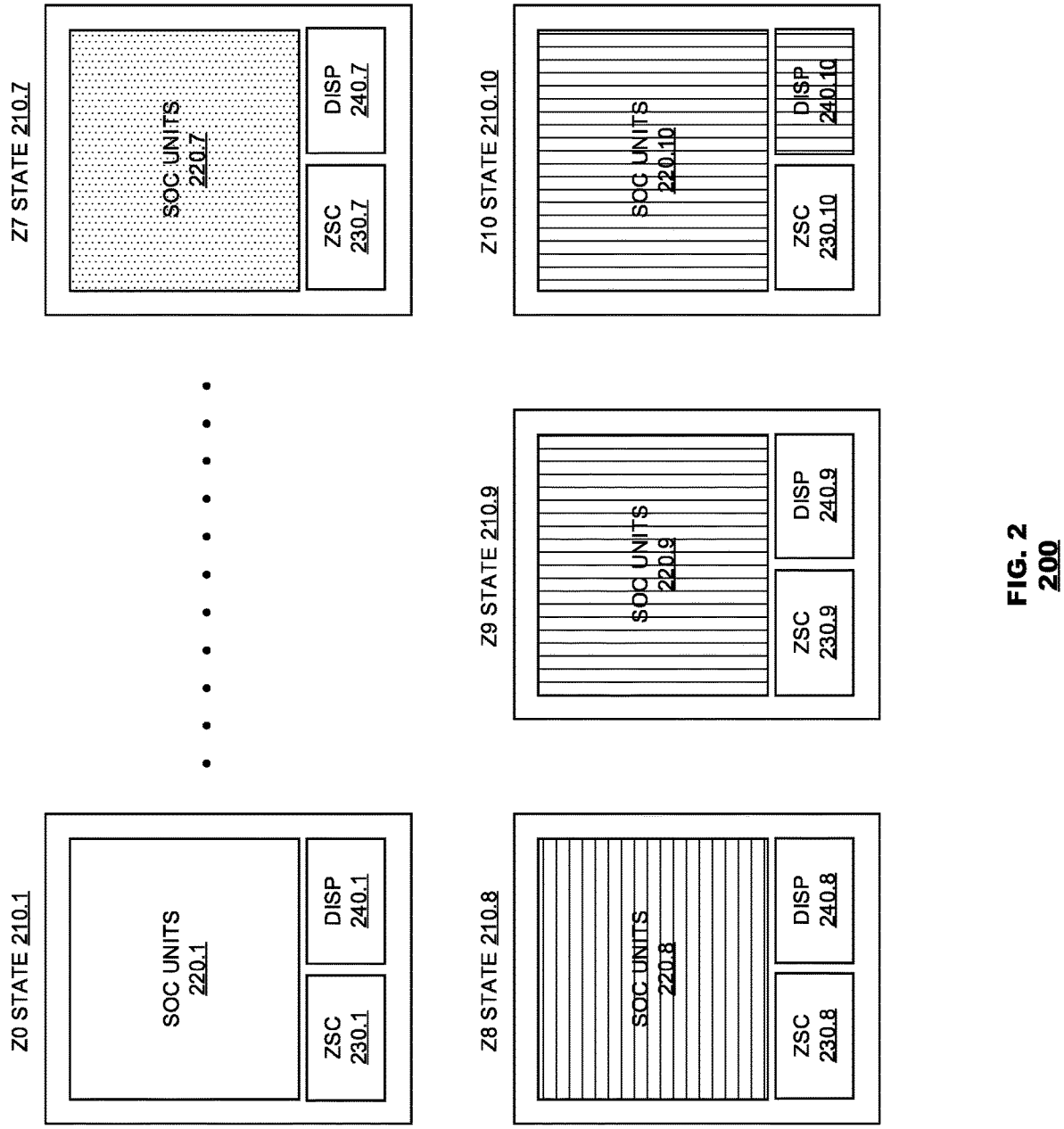
FIG. 2 is a diagram illustrating power states in an SoC, based on which one or more features of the disclosure can be implemented.

FIG. 2 is a diagram illustrating power states in an SoC 200, based on which one or more features of the disclosure can be implemented. The SoC 200 includes various SoC units 220, a Z-state controller (ZSC) 230, and a display interface (DISP) 240 (shown at different power states 210.1-10 in FIG. 2). The SoC units 220 typically include various processing units, such as CPUs (e.g., the processor 110 of FIG. 1), APUs (e.g., the APU 120 of FIG. 1). The SoC units 220 can also include local memory units, interfaces to external memory (e.g., the memory 150 of FIG. 1), IO subsystems to various peripheral units (e.g., the storage 130, the input devices 140, or the output devices 160 of FIG. 1), or embedded controllers, for example. The display interface 240 includes circuitry that facilitates the transfer of data from memory 150 to a display system (not shown). To conserve power consumption, the power supply to the SoC 200 is provided according to different power modes during which the SoC is placed at respective Z-states—for example, Z0 to Z10 power states 210.1-10. The Z-state controller 230 is a hardware-based controller, containing circuitry that control the transition from one state to another based on metrics it collects and monitors, as further disclosed herein.

In FIG. 2, ten Z-states are demonstrated. Note that the different states (e.g., an operational state, a clock-gated state, or a retention state) of the components 220, 230, 240 are indicated in FIG. 2 by different patterns as further described below. In a Z0 state 210.1 the SoC is operational, and, thus, its components 220.1, 230.1, 240.1 are supplied with power at normal voltage levels. In a Z7 state 210.7, the SoC units 220.7 are not operational, that is, they 220.7 are not in use by another internal or external unit, and, thus, are in a sleeping (or idle) mode of operation until awaken. To save power, those SoC units 220.7 are placed in a clock-gated state. In a clock gated state, the clocks of the SoC units 220.7 are turned off, but their supplied voltage levels are kept the same as in an operational mode. Various intermediate states, between Z0 210.1 and Z7 210.7 states may be maintained, where, for example, only a subset of the SoC units are not operational, and, therefore, only that subset is placed in a lower power state (relative to Z0 210.1).

To increase saving in power consumption when units 220 of the SoC are not in an operational mode (i.e., are idle), in a Z8 state 210.8, the units 220.8 are placed in a retention state. In a retention state the clocks of the SoC units 220.8 are turned off while their 220.8 supplied voltage levels are lowered to respective levels that are just enough to preserve the data in their logic circuitry and memory cells. Further power consumption may be achieved by placing the SoC in a Z9 state 210.9. In this state 210.9, the clocks of the SoC units 220.9 are turned off and their 220.9 supplied voltage levels are set to zero. Notice that in states Z0-Z9 210.1-9, the display interface 240.1-9 is in an operational mode, as a display system (that the display interface 240 serves) has to be continuously refreshed (for example, a display with a stutter time efficiency of 95%, has to be provided with data to be displayed during 5% of a time period). Accordingly, data have to be periodically transferred from memory to the display system by the display interface 240, and, thus, power to the display interface 240 is not interrupted when the SoC is placed in states Z0-Z9 210.1-9. However, the display system may be capable of self-refreshing its displays, operating in a panel self-refresh (PSR) mode. Such a display system buffers the data to be displayed, so that no data transferred from memory may be needed during a time period when the SoC units are idle. In such a case, to maximize power consumption saving, the SoC can be placed in a Z10 state 210.10, where the clocks of the SoC units 220.10 and of the display interface 240.10 are turned off and their 220.10, 240.10 supplied voltage levels are set to zero.

Hence, the states Z1 to Z10 210.1-10 represent a spectrum of power supply schemes—starting with state Z0 210.1 (where power consumption may be at its maximum), through intermediate states Z1-Z8 (with progressively reduced power supply), and ending with states Z9 or Z10 (where power consumption may be at its minimum). The Z-state controller 230 contains circuitry that carry out the transitions from one Z-state to another, and, therefore, the controller 230.1-10 has to be powered in all the Z-states 210.1-10. The Z-state controller 230 contains timers and logic that are required to carry out the recovery from a low power state (when, for example, an interrupt is received that wakes up a unit 220 from a sleeping mode). As further explained herein, the deeper the Z-state (farther on the spectrum from the Z0 state 210.1), the higher the cost in recovering from that state back to the Z0 state 210.1. The cost of recovering from a state, as referred to herein, includes the cost associated with the energy spent to enter the state and the cost associated with the energy spent to exit the state. Thus, in deciding, for example, whether to place the SoC 200 in a Z8 state 210.8 or in a Z9 state 210.9, the Z-state controller 230 should consider the cost of recovering from a given state. To that end, the Z-state controller 230 can be set to predict the potential in saving power that is a function of the time duration the SoC 200 is likely to stay in a state it is placed in. Hence, the Z-state controller 230 is configured to track (monitor) various metrics, based on which it 230 determines in what power state 210.1-10 to place the SoC. Such metrics can include metrics that are associated with the current state of the SoC as well as metrics that are associated with past performance of the Z-state controller 230, as disclosed herein.

Figure 3:
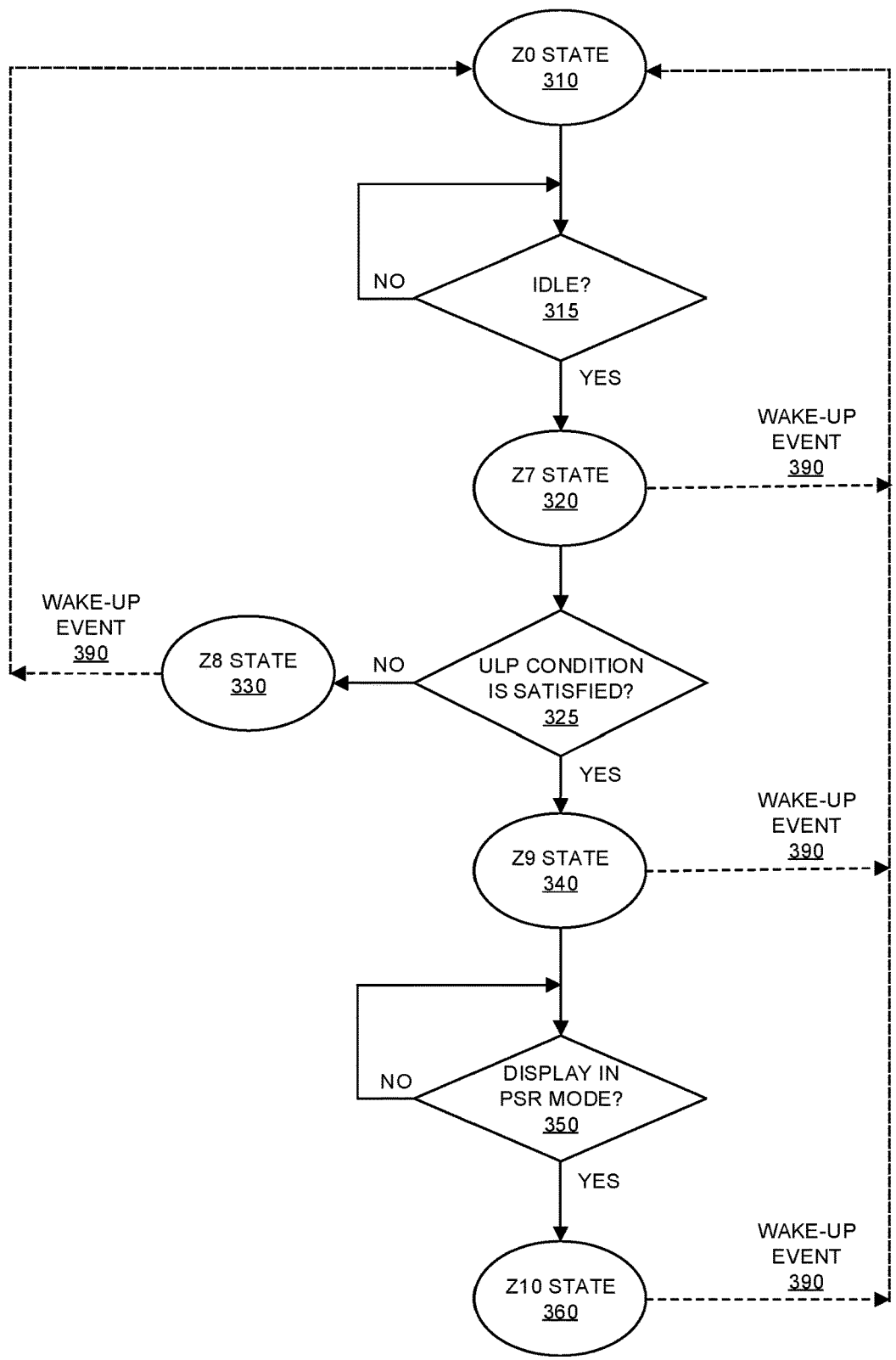
FIG. 3 is a flowchart of an example method for power state transitioning, based on which one or more features of the disclosure can be implemented.

FIG. 3 is a flowchart of an example method 300 for power state transitioning, based on which one or more features of the disclosure can be implemented. The method 300 is employed by the Z-state controller 230 as follows. In an operational mode, when the SoC units 220 are not idle (e.g., one or more units 220 are processing data or performing computational tasks), the SoC is in a Z0 state 310. When the SoC units 220 are not operational 315 (that is, they 220 are idle or in a sleeping mode, not being in use by another internal or external unit), the Z-state controller 230 can place the SoC in a Z7 state 320. In a Z7 state 210.7, the SoC units 220.7 are placed in a clock-gated state. As mentioned above, in a clock gated state, the clocks of SoC units 220.7 are turned off but their supplied voltage levels are kept the same as in an operational mode. Thus, a reduced amount of power is consumed by the SoC when placed in this state 210.7.

To allow for further saving in power consumption, the Z-state controller 230 can determine 325, based on metrics it tracks, whether to place the SoC 200 in a deeper power state. To that end, the Z-state controller 230 can decide, whether to place the SoC 200 in a lower power state (that is, a Z8 state) or in an ultra-low power state (that is, Z9 or Z10). The Z-state controller 230 makes that decision based on a condition, namely, an ultra-low power (ULP) condition 325, that is derived from measured metrics. If, based on these metrics, the ULP condition is not satisfied, the Z-state controller 230 can place the SoC 200 in a Z8 state 330. In a Z8 state 210.8, the SoC units 220.8 are placed in a retention state. In a retention state the clocks of the SoC units 220.8 are turned off while their supplied voltage levels are lowered to respective levels that are just enough to preserve the data in their logic circuitry and memory cells. Thus, in this state, less power is consumed relative to a Z7 state due to the reduced voltage levels that are supplied to the SoC units 220.8. However, if the ULP condition is satisfied, the Z-state controller 230 can place the SoC 200 in a Z9 state 340.

In a Z9 state 210.9, the clocks of the SoC units 220.9 are turned off and their supplied voltage levels are set to zero. Hence, further saving in power consumption is provided in a Z9 state 210.9 relative to a Z8 state 210.8. In a Z9 state 210.9, as in the shallower states 210.1-8, the display interface 240.9 is powered. As explained above, data to be displayed have to be periodically transferred from memory to the display system by the display interface 240, and, thus, power to the display interface 240 is not interrupted when the SoC is placed in states 210.1-9. However, when the display system moves to operate in a PSR mode (where data to be displayed are buffered in the display system), further saving opportunity is available by turning off the power supplied to clocks and circuitry in the display interface 240. Accordingly, when the display interface operates in a PSR mode 350, the Z-state controller 230.10 places the SoC in a Z10 state 210.10. In this state 210.10, power is supplied only to the Z-state controller 230.10, and, thus, the saving in power consumption is maximized in this state 230.10.

Once the SoC is awakened and is required to return into an operational mode, the Z-state controller 230 has to place the SoC back into state Z0, where power is supplied to the clocks and circuitry of the SoC components at normal voltage levels. Accordingly, in response to a wake-up event 390, the Z-state controller 230 has to recover the SoC 200 from a low power state (e.g., one of the Z7-Z10 states 210.7-10) it was placed in 320, 330, 340, 360. A wake-up event may be an interrupt, for example, that indicates that an external (or internal) unit requires to be served by one or more SoC units 220. Typically, the costs involved in recovering from each power state are different—the deeper the power state, the more time, and, therefore, the more power, is spent in entering and exiting that state. For example, the cost that is involved in recovering from a Z9 state (including placing the SoC units 220 in a Z9 state and then placing them back into a Z0 state) is higher than the cost involved in recovering from a Z8 state. The recovery cost from a state should, therefore, be balanced against the expected time period during which that state lasts. The higher the recovery cost of a state, the longer the time period of residing in that state should be, so that the saving in power associated the SoC 200 stay in that state will be sufficiently higher than the power spent on entry into and exit from that state. The likelihood for saving power as a result of placing the SoC in a certain power state is proportional to the time the SoC is likely to reside in that power state (the time a power state is likely to last from the state's initiation until its ending in response to a wakeup event 390). Whether such time is expected to be long enough to result in a saving in power can be determined based on metrics, as further described below.

The ULP condition 325 can be satisfied by metrics that are associated with the current status of components internal or external to the SoC and metrics that are associated with past transitions into power states. The former can include metrics associated with the operational statuses of processing units 220 in the SoC 200. Thus, to satisfy the ULP condition 325, processing units, such as CPUs and APUs, have to be in a sleeping (idle) mode. The Z-state controller 230 can be informed when a processing unit 220 enters a sleeping mode by a respective status interrupt, for example. In an aspect, once the condition 325 to transition into an ultra-low power state (Z9 or Z10) has been satisfied, the controller 230 informs the processing units 220 about a transition initiation using a two-stage handshake-protocol. Thus, in response to a message that a transition is to take place into a Z-state, a processing unit stores the data it will need to restore back its status when exiting that Z-state, after which the processing unit sends the controller 230 a message indicating readiness for the transition. Similarly, the metrics can include the operational status of other components that are either internal or external to the SoC 200, such as embedded controllers and IO subsystems. To satisfy the ULP condition 325, such components have to be inactive (e.g., idle or in a sleeping mode).

The metrics can further include timer-based metrics associated with respective timers, each of which indicates the time at which a respective processing unit 220 is to be awaken. The timers, for example, can be set by system components (internal or external to the SoC) that interact with respective processing units 220 of the SoC. If the time values indicated by the timers are below a certain threshold, it may not be worthwhile to transition the SoC into a low power state (such as, Z9 or Z10). This is because, in doing so, the saving in power may not be larger than the power consumed by entering and exiting that state. Thus, to satisfy the ULP condition, these timer-based metrics should be above a predetermined threshold. The pre-determined threshold may be determined (e.g., based on experimentations) with respect to each power state based on the cost of recovering from that power state, that is, the cost associated with entering and exiting that power state.

The metrics can further include latency-based metrics. A latency-based metric can be associated with a bus system of the SoC 200 for example, such as an interconnect fabric or a peripheral component interconnect express (PCIe). The latency-based metrics can be derived from a latency threshold report (LTR). Thus, a bus system can report to the Z-state controller 230 its latency tolerance. That latency tolerance can be compared with the latency that will be caused by exiting from a Z-state. For example, a bus system may not be able to tolerate a latency of more than 10 milliseconds when the bus system is required to serve an application on a host, and, thus, a corresponding SoC unit 220 (that serves the bus system) has to be able to get out of a Z-state fast enough to respect that tolerance. To satisfy the ULP condition, an LTR reported by a bus system should be above a predetermined threshold. The pre-determined threshold may be determined (e.g., based on experimentation) with respect to each power state based on the time it takes to exit from that power state.

Metrics based on information derived from past transitions into lower power states can be used to determine whether a current transition into a certain state is likely to result in power saving. For example, the number of successful transitions into a Z-state, such as Z9 or Z10, may be tracked during a rolling time window that proceeds the current time. A successful transition into a Z-state can be measured by a Z-state placement time—that is, the time a Z-state had lasted before being ended by a wake-up call. If a Z-state placement time is above a minimum time value—so that the benefit of placing the SoC in the Z-state surpasses the cost associated with it—the placement is recorded as a successful placement. Thus, a successful Z-state placement is one that resulted in saving power consumption that is higher than the power spent in entering and existing that Z-state. Accordingly, if the rate of successful transitions, recorded during a rolling time window, is above a predetermined threshold (e.g., 80%) then the ULP condition (with respect to this metric) is satisfied. In an aspect, each time the Z-state controller has to exit a Z-state that lasted for at least a minimum time value, the Z-state controller increments a counter. And, each time the Z-state controller has to exit a Z-state that lasted less than that minimum time value, the Z-state controller decrements that counter. The incrementing and the decrementing of such counter can be by different respective increment and decrement levels. For example, such increments can be proportional to a frequency of entering the Z-state or other Z-states (e.g., within the rolling time window). Hence, if the counter is above a predetermined threshold, then the ULP condition (with respect to this metric) is satisfied.

Other historical information can be used as metrics too. For example, the rate of messages (e.g., interrupts) received by the SoC units 220 may be used as a metric based on which the satisfaction of the ULP condition with respect to that metric can be determined. For example, a rate of messages that is above a predetermined threshold can result in a satisfaction of the ULP condition. The number of those messages can be recorded within a rolling time window, for example. The messages can be weighed differently depending on the SoC unit 220 they addressed.

The Z-state controller 230 can be configured to utilize the metrics, disclosed herein, to determine the satisfaction of the ULP condition 325. Alternatively, the Z-state controller 230 can be configured to utilize only a subset of those metrics. The Z-state controller 230, thus, generates and updates the metrics based on which a satisfaction of the ULP condition 325 is periodically determined. As described in reference to FIG. 3, if the ULP condition 325 is satisfied, the Z-state controller 230 places the SoC in a Z9 state 340 (or in a deeper state Z10 360, if the display system is in a PSR mode 350).

Figure 4:
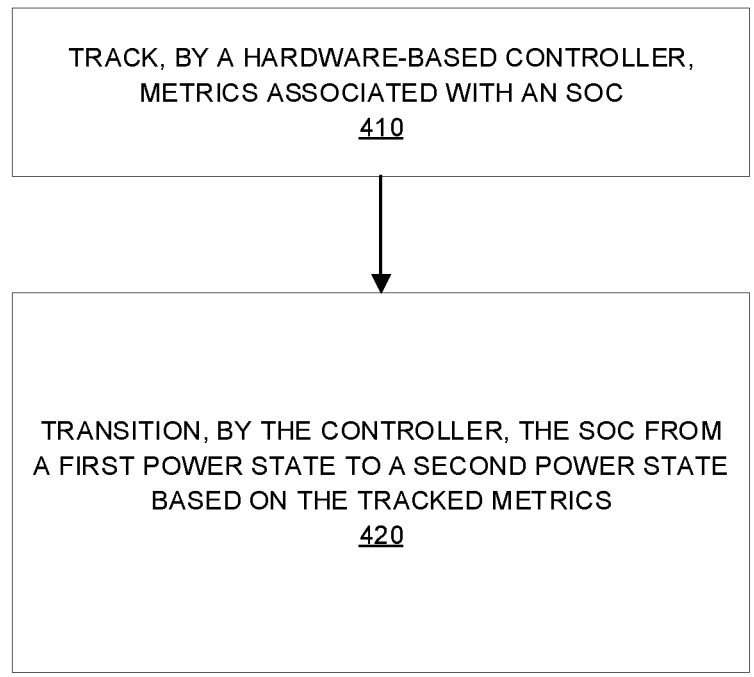
FIG. 4 is a flowchart of an example method for transitioning into ultra-low power states, based on which one or more features of the disclosure can be implemented.

FIG. 4 is a flowchart of an example method 400 for transitioning into ultra-low power states, based on which one or more features of the disclosure can be implemented. The method 400 employs a hardware-based controller 230 to transition an SoC 200 into different power states. The method 400 tracks metrics associated with the SoC, in step 410. To save power, in step 420, the method 400 transitions the SoC from a first power state to a second power state based on the tracked metrics, where the total amount of power that is used by at least a portion of the transition between the first power state to the second power state and a time spent in the second power state is less than the total amount of power that would have been used by remaining in the first power state. In an aspect, the first power state is the current power state (e.g., Z7 state 320) and the second power state is a lower power state (e.g., Z8 state 330) or an ultra-low power state (e.g., Z9 state 340 or Z10 state 360).

The metrics include a metric associated with an operational status of a processing unit associated with the SoC, where the transition is performed when the operational status is idle. The metrics can include a timer-based metric that indicates the time remaining for a processing unit associated with the SoC to be in an idle operational status, where the transition is performed when the time is above a predetermined threshold. The metrics can also include a latency-based metric that indicates a latency tolerance of a processing unit associated with the SoC, where the transition is performed when the latency tolerance is above a predetermined threshold. The metrics can further include a metric associated with a rate of messages received by a processing unit associated with the SoC, where the transition is performed when the rate is below a predetermined threshold. In an aspect, the metrics include a metric based on information derived from past transitions of the SoC into power states. Such information can be a rate of successful transitions, where a successful transition is a transition with a placement time above a minimum time, and where the transition is performed when the rate is above a predetermined threshold.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be maskworks that are then used in semiconductor manufacturing processes to manufacture processors that implement aspects of the embodiments.

The methods or flowcharts provided herein can be implemented in a computer program, software, or firmware incorporated in a non-transitory computer-readable storage medium for execution by a general-purpose computer or processor. Examples of non-transitory computer-readable media include read only memory (ROM), random-access memory (RAM), a register, cache memory, semiconductor memory devices, magnetic media such as internal hard drive and disks and removable disks, magneto-optical media, and optical media such as CD-ROM disks, and digital versatile disks (DVDs).

What is claimed is:

1. A method for transitioning, a system on a chip (SoC) into different power states, comprising:
    tracking metrics associated with the SoC; and
    transitioning the SoC from a first power state to a second power state based on at least one of the tracked metrics, wherein a total amount of power that is used by at least a portion of the transition between the first power state to the second power state and a time spent in the second power state is less than a total amount of power that would have been used by remaining in the first power state;
    wherein the at least one of the tracked metrics is associated with a rate of messages received by processing units associated with the SoC, wherein the rate of messages is weighted by processing unit.

2. The method of claim 1, wherein the second power state is a lower power state than the first power state.

3. The method of claim 1, wherein the metrics comprise:
a metric associated with an operational status of a processing unit associated with the SoC, wherein the transitioning is performed when the operational status is idle.

4. The method of claim 1, wherein the metrics comprise:
a timer-based metric indicative of the time remaining for a processing unit associated with the SoC to be in an idle operational status, wherein the transitioning is performed when the time is above a predetermined threshold.

5. The method of claim 1, wherein the metrics comprise:
a latency-based metric indicative of a latency tolerance of a processing unit associated with the SoC, wherein the transitioning is performed when the latency tolerance is above a predetermined threshold.

6. The method of claim 1, wherein the metrics comprise:
a metric based on information derived from past transitions of the SoC into power states.

7. The method of claim 6, wherein the information derived from past transitions comprises:
a rate of successful transitions, wherein a successful transition is a transition with a placement time above a minimum time, and wherein the transitioning is performed when the rate of successful transitions is above a predetermined threshold.

8. The method of claim 1, wherein
the transitioning is performed when the rate of messages received is below a predetermined threshold.

9. A controller for transitioning a system on a chip (SoC) into different power states, comprising:
at least one processor; and
memory storing instructions that, when executed by the at least one processor, cause the processor to:
track metrics associated with the SoC, and
transition the SoC from a first power state to a second power state based on at least one of the tracked metrics, wherein a total amount of power that is used by at least a portion of the transition between the first power state to the second power state and a time spent in the second power state is less than a total amount of power that would have been used by remaining in the first power state;
wherein the at least one of the tracked metrics is associated with a rate of messages received by processing units associated with the SoC, wherein the rate of messages is weighted by processing unit.

10. The controller of claim 9, wherein the metrics comprise:
a metric associated with an operational status of a processing unit associated with the SoC, wherein the transitioning is performed when the operational status is idle.

11. The controller of claim 9, wherein the metrics comprise:
a timer-based metric indicative of the time remaining for a processing unit associated with the SoC to be in an idle operational status, wherein the transitioning is performed when the time is above a predetermined threshold.

12. The controller of claim 9, wherein the metrics comprise:
a latency-based metric indicative of a latency tolerance of a processing unit associated with the SoC, wherein the transitioning is performed when the latency tolerance is above a predetermined threshold.

13. The controller of claim 9, wherein the metrics comprise:
a metric based on information derived from past transitions of the SoC into power states.

14. The controller of claim 13, wherein the information derived from past transitions comprises:
a rate of successful transitions, wherein a successful transition is a transition with a placement time above a minimum time, and wherein the transitioning is performed when the rate of successful transitions is above a predetermined threshold.

15. The controller of claim 9, wherein
the transitioning is performed when the rate of messages received is below a predetermined threshold.

16. A non-transitory computer-readable medium comprising instructions executable by at least one processor to perform a method for transitioning a system on a chip (SoC) into different power states, the method comprising:
tracking, metrics associated with the SoC; and
transitioning the SoC from a first power state to a second power state based on at least one of the tracked metrics, wherein a total amount of power that is used by at least a portion of the transition between the first power state to the second power state and a time spent in the second power state is less than a total amount of power that would have been used by remaining in the first power state;
wherein at least one of the tracked metrics is associated with a rate of messages received by processing units associated with the SoC, wherein the rate of messages is weighted by processing unit.

17. The medium of claim 16, wherein the metrics comprise:
a metric associated with an operational status of a processing unit associated with the SoC, wherein the transitioning is performed when the operational status is idle.

18. The medium of claim 16, wherein the metrics comprise:
a timer-based metric indicative of the time remaining for a processing unit associated with the SoC to be in an idle operational status, wherein the transitioning is performed when the time is above a predetermined threshold.

19. The medium of claim 16, wherein the metrics comprise:
a latency-based metric indicative of a latency tolerance of a processing unit associated with the SoC, wherein the transitioning is performed when the latency tolerance is above a predetermined threshold.

20. The medium of claim 16, wherein the metrics comprise:
a metric based on information derived from past transitions of the SoC into power states, the information comprises a rate of successful transitions,
wherein a successful transition is a transition with a placement time above a minimum time, and wherein the transitioning is performed when the rate is above a predetermined threshold.

* * * * *